United States Patent Office 2,861,454
Patented Nov. 25, 1958

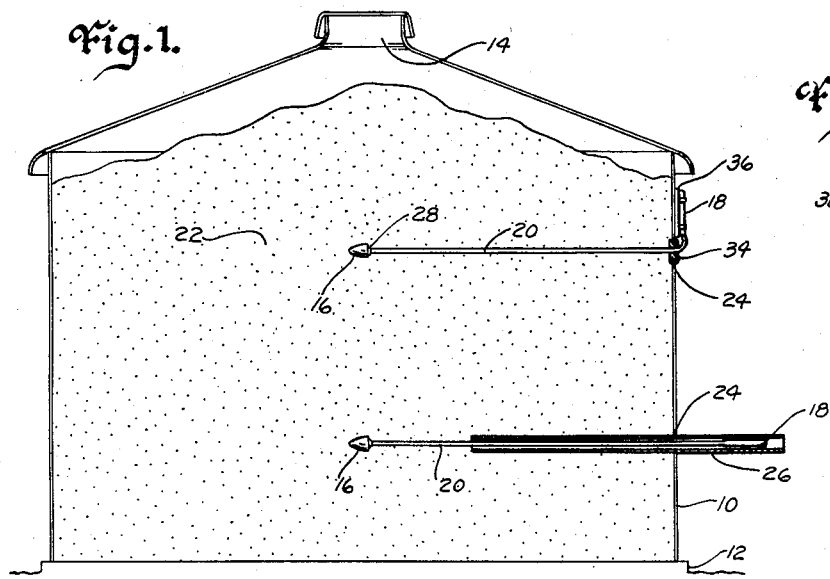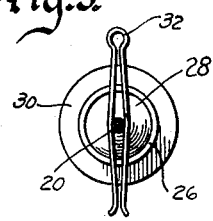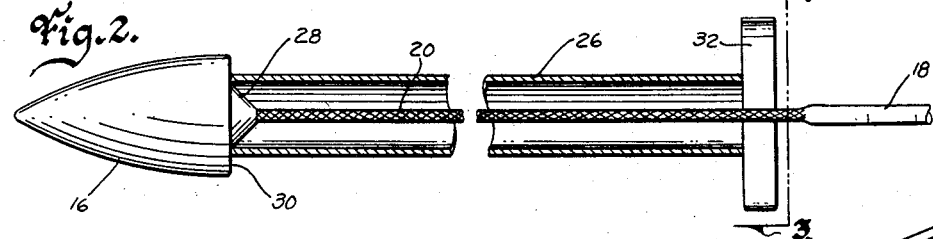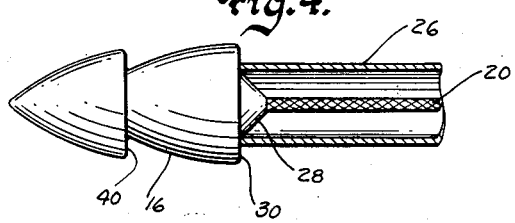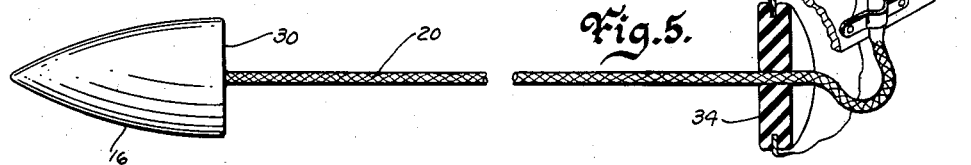

2,861,454
GRAIN THERMOMETER
Erich Rahlson, Des Moines, Iowa
Application July 11, 1955, Serial No. 521,191
2 Claims. (Cl. 73—352)

This invention is a device for measuring the temperature of small grains, corn, seed and other agricultural products that are stored in bins and these agricultural products will be referred to below by the single term grain. The invention comprises a thermometer that gives an indication of temperature at a point remote from the point at which the temperature is measured and referred to below as a remotely read thermometer and a novel means for installing the thermometer in a bin full of grain. For purposes of this application, the remotely read thermometer has three parts which are a temperature responsive unit, a temperature indicating unit and a conductor communicating between the first to portions to transmit responses of temperature from the pick up to the indicating unit.

Grain can be stored safely if it is free from disease, excessive moisture etc. Even with modern techniques, however, it is not possible always to determine in advance whether the grain will store well. It is known, though, that spoiling grain shows a marked increase in temperature as compared to the temperature registered when it is safely stored. If a rise in temperature occurs and it cannot be explained by increase in outside air temperatures, one is warned that the grain must be removed from the bin and properly treated or it will spoil. It is important, consequently, to check regularly the temperature of stored grain to be warned of possible loss indicated by temperature. So warned, timely correction of undesirable conditions can be made.

Heretofore, the temperature of grain in storage has been determined in one of two ways. One method has been to use a system of thermocouples installed as cables in the grain storage elevator or the like. A potentiometer connected to the various thermocouples will give an indication of the voltage being generated at them. The potentiometer face is calibrated in terms of degrees of temperature. This is a permanent installation. It is rather expensive and finds its principal use in large elevators.

Thermocouple structures such as that described above could be used in the relatively small steel grain storage bins that are now being used widely. Because thermocouple structures are rather expensive, however, it is not commonly found in these steel bins. A known less expensive device that could be applied to these small bins comprises a bulb thermometer inside of a metal case for protection. While the thermometer is short, the case is provided with a long handle. By means of this handle, the case carrying the thermometer can be forced down into grain for several feet. As the thermometer is encased to protect it during the probing stage, it must be left in the grain for a substantial period of time to allow the bulb of the thermometer to reach the temperature of the surrounding grain. At the end of this waiting period the case is withdrawn, opened and the temperature observed and recorded. These steps are repeated at different levels and places. A minimum of two readings is thought necessary even for the rather small bins. Because this last system of probing to check the temperature of the stored grain is time consuming, the temperature is not checked as frequently as it might be otherwise. The inconvenience of getting on top of the bin to gain access to the grain for probing is also a deterrent to regular and frequent checking of the grain temperature. That this second method is used at all can be explained best by the relatively high cost of the thermocouple structure.

I have invented a structure that combines the merits of both of these two previous methods to a degree. My invention provides a means for using inexpensive thermometer structures to give a constant indication of the temperature of stored grain. It makes the convenience of the thermocouple system available to those who have small installations. The invention broadly is any device for remotely indicating temperatures and means for inserting the temperature responsive unit portion of the device into a bin of stored grain. The grain in the bin serves as a support for the temperature responsive unit and most of the response transmitting structure of the thermometer which minimizes supporting structure and, therefore, installation time.

Accordingly it is the main object of this invention to provide a novel grain thermometer; one that:
 (1) Can be installed in a bin full of grain.
 (2) Uses the grain in storage to support a portion of the thermometer.
 (3) Gives a constant indication of temperature.
 (4) Can be installed very quickly and easily.
 (5) Places a minimum of strain on the thermometer during installation.
 (6) Is inexpensive.

While the foregoing specifically listed objects of this invention are the main ones, it is my intention to include as objects hereof any such as may be clear to one who is skilled in this field of endeavor after he has read this specification, including the claims, and examined the accompanying drawings which are briefly described as follows:

Fig. 1 is a vertical section of a grain storage bin in which the thermometer is shown;

Fig. 2 is an enlarged fragmentary side elevation of the thermometer with the inserting device shown in longitudinal section; portions of the conductor are omitted to save space;

Fig. 3 is a cross sectional view taken on the line 3—3 of Fig. 2;

Fig. 4 is a fragmentary side elevation view of the thermometer with a modified form of responsive unit shown; it is drawn to the same scale as Fig. 2; and Fig. 5 is a partial side elevation partial perspective of the thermometer with a fragment of a bin wall shown in section together with the sealing grommet; part of the conductor is omitted to save space and the scale used is that of Fig. 2.

In the accompanying drawings, the invention is shown in Fig. 1 in use and being installed in a grain storage bin 10 secured to a suitable foundation 12. While the invention may be used to advantage in many grain storage units, these relatively small steel storage bins are the type of grain storage which illustrates the use of my invention particularly well. I have shown one here illustratively for that reason. Bin 10 has the usual covered access port 14 for filling, but the usual grain removal door is not shown. In Fig. 1 the temperature responsive unit 16 of the heat responsive fluid containing bulb type communicates with a temperature indicating unit 18 via any suitable temperature indication conductor 20. Grain 22 surrounds and supports the responsive unit 16 and the majority of conductor 20. As suggested already, a major feature of the invention is that it can be placed in bins already filled. An inherent result of inserting the device into bins full of grain, at least when the conductor extends horizontally as in Fig. 1, is the supporting of the temperature responsive unit and a majority of the conductor in operating position solely by the grain around it or them. No special supporting structure is necessary which eliminates the need for installing any supports and also securing the temperature responsive unit to them. In order to insert the responsive unit and conductor into the bin, a hole 24 is made in the bin 10 using any conventional means. Hole 24 is large enough to receive responsive unit 16. A small quantity of grain will escape through the hole during installation, but the loss will be negligible. After the hole is made, unit 16 and the majority of conductor 20 are forced into the grain until the temperature responsive unit is placed as desired.

Installation of the unit 16 is possible by engaging the responsive unit with a stiff element of sufficient rigidity to be forced into the grain in a controlled direction, tube 26 being an example. If a tube is used around conductor 20, a suitable centering device such as the cone 28 is advantageous. Cone 28 should not be very thin and tapering but rather broad and squat to avoid any possibility of wedging of the cone in tube 26. By the use of a centering structure the point of unit 16 is held pointed into the grain 22. As the purpose of the point is to make it easier to force the temperature responsive unit into the grain, it is more efficient to keep it pointed in the direction of movement. Also the element 30 can engage the grain on all sides of stiff element 26 when the latter is centered. When the stiff element is withdrawn, as it may be at least after the temperature responsive unit is correctly placed; the grain can engage the element 30 to hold the temperature responsive unit against being partly withdrawn with the tube. Stiff element 26 is permitted free movement in one direction relative to the temperature responsive unit, but the stiff element can move only to a limited extent relative to the temperature responsive unit in the other direction. Regardless of the centering structure, however, the unit 16 can be held stable in relation to the stiff inserting element 26 by placing a tension on conductor 20 after the stiff element has engaged the limiting means on the unit 16. This tension may be maintained manually or by a suitable mechanical means such as clip 32. The clip is longer than the diameter of the tube 26 and when clamped on the conductor as shown in Fig. 2, will resist any tendency of the conductor to slip into the tube. Another way of stating the function of clip 32 is to say that it is a means for limiting relative movement of the stiff element and the temperature responsive unit in a second direction. It is a limiting means that can be applied and released selectively. Clip 32 must be removed before tube 26 can be slipped out of the bin leaving the unit 16 in place. Since hole 24 is large enough to admit the stiff element and the conductor, it is substantially larger than the conductor alone. Some suitable means such as rubber grommet 34 seals the space between the conductor 20 and the edges of hole 24 in bin 10 after the stiff element 26 has been removed.

Temperature indicating unit 18 is mounted conveniently on the exterior of bin 10 in a suitable manner as on base 36 by straps 38. If a tube is used for inserting the unit 16 and conductor, indicating unit 18 must be rather readily removable from straps 38. The calibrations of the indicating unit are preferably directly on the unit 18. Its position relative to base 36 need not be precise if the unit itself is thus calibrated.

Unit 16 and conductor 20 must be strong enough to resist the compression and tension forces placed on them. Hence the temperature responsive unit may be armored or made very sturdily to avoid breakage which may result in a thermometer of rather slow response. Since the unit 16 is left in place once it is positioned, however, it will be subjected to grain temperature continuously and give accurate readings for the temperature of the grain on one day as compared to previous days. It is the temperature of the grain over a period of several days that is indicative of the condition of the grain. Unit 16 may be made as sturdy as the situation demands without disadvantage. Also because it is the comparative temperature of the grain that signals danger; indicating unit 18 need not be particularly accurate in terms of absolute temperatures. Consequently, the thermometer structure that is used will not require the care in manufacture that some would and so is relatively inexpensive. In fact these thermometers are preferably to be so inexpensive as to be expendable in the event they are forgotten and damaged by being left in the bin when the grain is removed by a power conveyor for example. Normally the thermometer will be removed prior to removing the grain by simply pulling on conductor 20 and guiding the temperature responsive unit through hole 24.

Fig. 4 shows a modified form of the invention in which there is provided a second grain engaging element 40 that does not coincide with the point at which the stiff element 26 engages the temperature responsive unit to limit relative movement therebetween. A grain engaging element such as the one 40 may be used alone or with the element 30 as shown in Fig. 4.

Fig. 5 shows a modified form of the invention which has no centering structure for the centering of the stiff element 26 relative to the temperature responsive unit. In a structure such as this, clip 32 would be relied on as the means to keep the conductor from slipping out of the tube. While this structure is workable, it places more tension and strain on conductor 20 and is not, for this reason the preferred form of the invention.

I have disclosed my invention both by setting out the inventive concept and describing and showing several illustrative practical embodiments of it, and I now point out particularly what I believe to be my invention in the following claims.

I claim:

1. In a grain thermometer; a temperature responsive unit; a temperature indicating unit; a flexible means for transmitting temperature responses secured to and communicating between said temperature responsive unit and indicating unit; said temperature responsive unit being substantially larger in cross section than said temperature indicating unit and said flexible means; a removable rigid tube sleeved over the latter two elements and engaging the former to provide a means for forcing said temperature responsive unit and a portion of said flexible means into the grain, whereby after such insertion the rigid tube may be withdrawn leaving said temperature responsive unit and a portion of said flexible means in the grain.

2. The grain thermometer of claim 1 in which a cone is secured to said temperature responsive unit where it is secured to said flexible means; said cone having its base facing said temperature responsive unit; the base of said cone being smaller than said temperature responsive unit and centered with respect to it; said cone being short and squat in shape; whereby said rigid tube when sleeved over said temperature indicating unit and flexible means to engage said temperature responsive unit is centered in respect to it and the possibility of said rigid tube becoming wedged on said temperature responsive unit is avoided.

References Cited in the file of this patent

UNITED STATES PATENTS

| | | |
|---|---|---|
| 1,224,385 | Kennedy | May 1, 1917 |
| 1,563,104 | Pedersen | Nov. 24, 1925 |
| 2,052,479 | Loggins | Feb. 11, 1936 |
| 2,132,095 | Broughton | Oct. 4, 1938 |
| 2,734,382 | Wassmer | Oct. 14, 1956 |